(12) United States Patent
Koval et al.

(10) Patent No.: US 8,179,434 B2
(45) Date of Patent: May 15, 2012

(54) SYSTEM AND METHOD FOR IMAGING OF CURVED SURFACES

(75) Inventors: Richard D. Koval, St. Charles, IL (US); Stephen L. White, Lake In The Hills, IL (US)

(73) Assignee: Mettler-Toledo, LLC, Columbus, OH (US)

( * ) Notice: Subject to any disclaimer, the term of this patent is extended or adjusted under 35 U.S.C. 154(b) by 790 days.

(21) Appl. No.: 12/245,471

(22) Filed: Oct. 3, 2008

(65) Prior Publication Data

US 2009/0278925 A1    Nov. 12, 2009

Related U.S. Application Data

(60) Provisional application No. 61/052,154, filed on May 9, 2008.

(51) Int. Cl.
*H04N 7/18* (2006.01)
(52) U.S. Cl. .................. 348/92; 348/352; 382/141
(58) Field of Classification Search .............. 348/86, 348/92; 382/103, 141, 142
See application file for complete search history.

(56) References Cited

U.S. PATENT DOCUMENTS

| | | | | |
|---|---|---|---|---|
| 6,507,366 | B1 * | 1/2003 | Lee | 348/352 |
| 6,661,911 | B1 * | 12/2003 | Ishikura et al. | 382/142 |
| 6,798,928 | B2 * | 9/2004 | Iida et al. | 382/305 |
| 7,626,158 | B2 * | 12/2009 | Diehr et al. | 250/223 B |
| 2001/0005264 | A1 * | 6/2001 | Slemon et al. | 356/237.2 |
| 2010/0222925 | A1 * | 9/2010 | Anezaki | 700/253 |
| 2010/0260378 | A1 * | 10/2010 | Noy et al. | 382/103 |

* cited by examiner

*Primary Examiner* — Viet Vu
(74) *Attorney, Agent, or Firm* — Standley Law Group LLP

(57) ABSTRACT

A system for capturing a composite image of an object with a curved surface includes a conveyor configured to transport the object to be imaged to a predetermined imaging position. A sensor is configured to produce a signal when the object to be imaged is at the predetermined position, and several cameras are arranged to photograph the object at the predetermined position from a plurality of different angles. A tracking module is used to receive the signal from the sensor, and output an actuating signal to the several cameras, such that each camera captures an image when the actuating signal is received. A processing device receives a captured image from each of the several cameras, manipulates the received images, and generates a composite image based on the manipulated images.

20 Claims, 4 Drawing Sheets

SYSTEM AND METHOD FOR IMAGING OF CURVED SURFACES

PRIORITY CLAIM AND REFERENCE TO RELATED APPLICATION

The application claims priority under 35 U.S.C. §119 from prior provisional application Ser. No. 61/052,154, which was filed May 9, 2008.

FIELD OF THE INVENTION

A field of the invention is visioning. An example application of the invention includes imaging of curved object surfaces.

BACKGROUND OF THE INVENTION

In production industries, a product is generally inspected to ensure quality before it is distributed. Traditionally, such inspection is performed by a human, but it has been found that humans tend to have a high degree of failure due to distraction, illness and/or other circumstances. For this reason, many industries turn to machine vision to perform inspections of production goods. Machine vision is a useful alternative to human inspection when high speed, high magnification, 24-hour operation, and/or repeatable measurements are required.

As an example, wine makers use machine vision to inspect empty bottles for chips, cracks or other imperfections, as well as dirt and dust. They also use machine vision to verify the fill level and cork positioning of filled wine bottles, and to approve full cases of wine before they are released for distribution. Additionally, machine vision can be used to check the labels on wine bottles for both presence and placement.

The California wine industry produced 2.7 billion bottles of wine in 2005. Wineries' bottling lines currently produce up to 300 bottles per minute. Accordingly, it is necessary for winemakers to have an inspection system that not only successfully detects and rejects substandard product, but does so quickly and efficiently. Put another way, a machine vision imaging system used in any industry must not only identify defects, but must also keep up with demand placed on the system by the manufacturing line.

Conventional machine vision systems rely on mechanical stops or an orientation device to position and orient the product to be inspected so that the product is in a predetermined position. Orienting the product so that the positioning is known allows for a reduction in required processing power, but the time required to mechanically orient each product to be inspected imposes limitations on the potential throughput of the inspection system.

SUMMARY OF THE INVENTION

One embodiment of the invention is a system and method for capturing a composite image of an object with a curved surface. The invention includes a conveyor configured to transport the object to be imaged to a predetermined imaging position. A sensor produces a signal when the object to be imaged is at the predetermined position, and several cameras are arranged to photograph the object at the predetermined position from a plurality of different angles. A tracking module is used to receive the signal from the sensor, and output an actuating signal to the several cameras, such that each camera captures an image when the actuating signal is received. A processing device receives a captured image from each of the several cameras, manipulates the received images, and generates a composite image based on the manipulated images.

In another embodiment, a vision imaging system is provided, the system including multiple or cameras configured to capture an image of a predetermined area. A sensor is connected to the cameras, so that the sensor transmits a signal to the cameras when an object to be imaged is within the predetermined area. An image processing device is configured to receive an image from each of the multiple cameras, and perform an image manipulation process on each of said received images, based on a predetermined object shape. The image processing device then generates a composite image of the object based on each of the manipulated images.

DETAILED DESCRIPTION OF THE PREFERRED EMBODIMENTS

The invention relates to a machine vision system that captures a composite image of an object with a curved surface. A processing device receives a captured image from each of the several cameras, manipulates the received images, and generates a 360° composite image based on the manipulated images. The composite image generated by the system can be used to inspect the product of a manufacturing or production line at a relatively high speed. For example, the system is capable of inspecting in excess of 200 objects per minute, and the speed of inspection could be increased to accommodate approximately 1200 objects per minute, depending on bottle size, inspections and available computer technologies.

Figure 1:
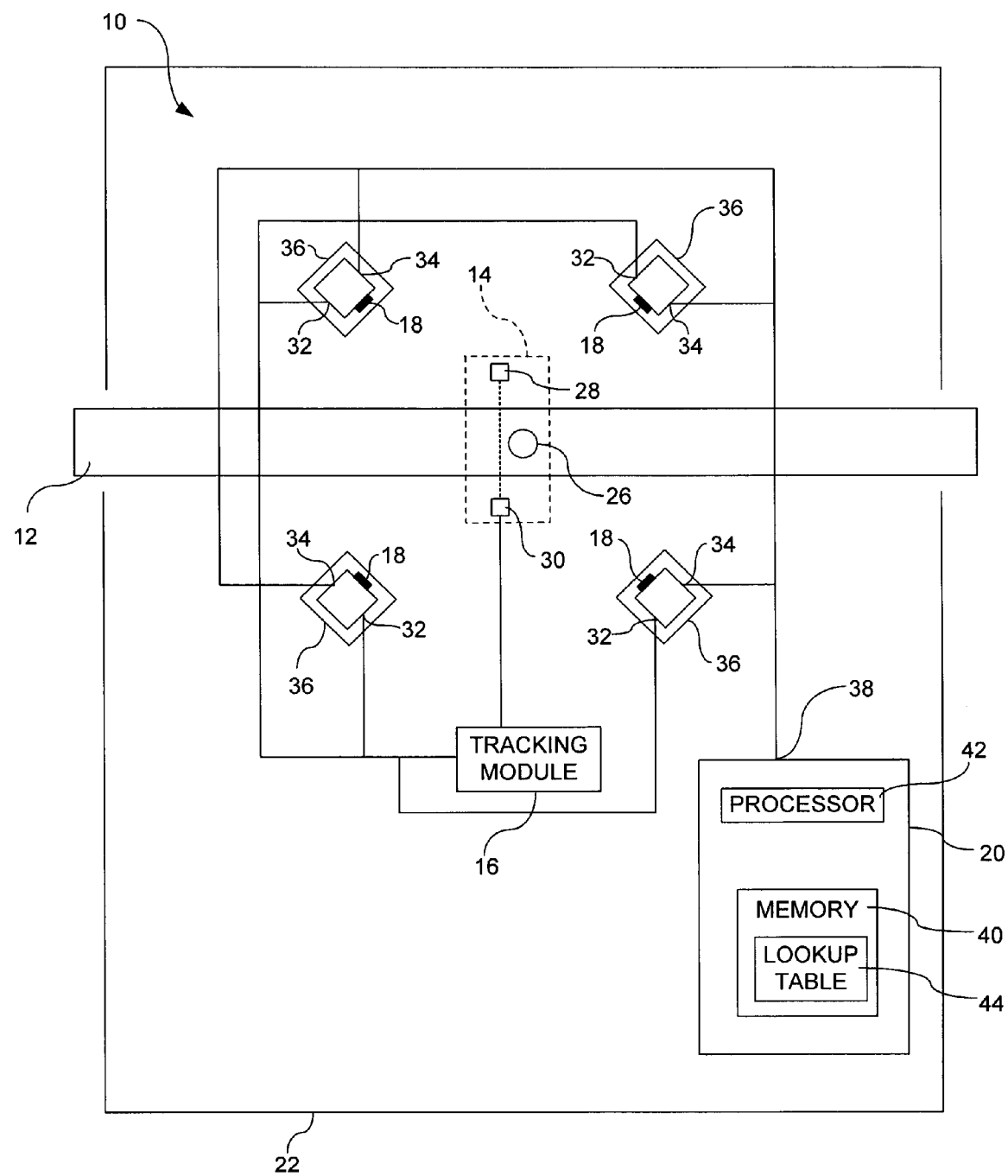
FIG. 1 is a block diagram of a system according to an embodiment of the invention.

Referring now to FIG. 1, an embodiment of a machine vision imaging system 10 is shown. The system 10 includes a conveyor 12 that is used to carry an object to be inspected through the system. Further included in the system 10 is a sensor 14 which is in communication with a tracking module 16. The tracking module 16 is, in turn, connected to each of two or more cameras 18 provided within the system 10, and each of the cameras is connected to an image processing apparatus 20. To help prevent ambient light from entering the system 10 and to protect the various components, an opaque housing 22 covers the entire system 10. Alternatively, the housing 22 may cover all portions of the system 10 except the image processing apparatus 20.

Within the housing 22, the system 10 is preferably lit using high-output lamps (not shown) mounted directly over the conveyor 12. This mounting position helps to minimize extraneous shadows. The mounting also creates a uniform light source within the system 10, which makes it easier to produce repeatable measurements. The high-output lamps are, for example, 36-120 watt high-output fluorescent bulbs, which have a very high light production/volume ratio. However, other high-output light sources, such as LED lighting, are also contemplated.

The conveyor 12 is a device that is used to carry objects to be inspected through the machine vision imaging system 10. For example, a moving belt or a series of rollers may be used. The conveyor brings objects from a production line into the system 10 and to a predetermined imaging and inspection area 26, and carries the objects from the imaging area out of the system to continue along the production line.

The sensor 14 is located at or near the imaging area 26, and is used to indicate that an object to be inspected has entered the inspection area. Sensor 14 is, for example, a photosensor that includes a light emitting portion 28 and a light sensitive portion 30. The light emitting portion 28 is configured to emit a beam of coherent light that crosses conveyor 12 and contacts the light sensitive portion 30. The sensor 14 produces no output as long as the beam of light emitted by the light emitting portion 28 remains in contact with the light sensitive portion 30. However, if the beam of light is broken or otherwise prevented from contacting the light sensitive portion 30, the sensor 14 produces a trigger signal that is output to the tracking module 16. While the trigger signal may be any measurable voltage, it is preferred that the signal be a relatively high voltage, such as a 24 volt signal, which helps to provide a more noise-immune signal. Also, even though a photosensor is described above, it is contemplated that sensor 14 may alternatively include other types of sensor, such as a pressure sensor or the like.

The trigger signal output by the sensor 14 is provided as an input to the tracking module 16. Tracking module 16 is a controller that is used to track the objects that are inspected by the system 10, and particularly to identify objects that do not pass inspection. In addition to tracking objects that do not pass inspection, tracking module 16 also acts as a fail-safe mechanism to help prevent substandard or uninspected objects from passing through the system 10. The tracking module 16 also provides as an output, a camera activation signal. The camera activation signal is output to each of the cameras 18 included in the system 10, and is generated upon receipt of the trigger signal from the sensor 14.

The magnitude of the camera activation signal output by the tracking module 16 is determined by the magnitude of the signal accepted at an input port 32 of each of the cameras 18. Accordingly, the cameras 18 preferably include an input port 32 that accepts a relatively high-voltage (e.g., approximately 12 to 24 volts) activation signal. As discussed above, the high voltage improves the noise-immunity of the system. Each camera 18 is preferably a digital still-frame camera capable of capturing images at a resolution of 640×480 pixels or better. Alternatively, it is contemplated that high-speed digital video cameras could be used in place of digital still-frame cameras. The high-output lights allow the cameras 18 to operate using a short shutter speed of about 100 µs to 1 ms depending on conveyor speed, and an aperture of F4 to F22 depending on the desired depth of field. These settings allow for a large depth of field, which aids in keeping the curved surface of the object in focus as it turns away from the camera 18. The cameras 18 are preferably arranged so that the object in the inspection area 26 is photographed from all angles. Additionally, there should be some overlap in the viewing angle of the cameras, to aid in image manipulation performed by the image processing apparatus 20. Each camera 18 should be securely mounted, such that the position of each camera is fixed and known. For example, in the system 10 shown in FIG. 1, there are four cameras 18 arranged around an inspection area 26 at 90 degree intervals, and each camera has a 120° field of view.

Each of the cameras 18 also includes an output port 34 that outputs a captured image to the image processing apparatus 20. The output port 34 preferably transmits the captured image according to the gigabit Ethernet standard (i.e., the standard defined by IEEE 802.3-2005), which increases the possible distance between the camera 18 and the image processing apparatus 20 without using repeaters or hubs. Alternatively, it is contemplated that any wired or wireless communication standard may be used to transfer data from camera 18 to the image processing apparatus 20, provided that the data throughput rate is sufficient to exceed the demands of the system 10.

Mounted substantially opposite (i.e., directly across viewing area 26 from) each camera 18 is one or more light guides 36. The light guides 36 are, for example, a passive light-gathering element made from a material such as a fluorescing acrylic or the like that will take in light produced by the high-output lamps from above and/or below the conveyor 12 and project the light. Alternatively, it is contemplated that each of the light guides 36 may include one or more light sources, such as light emitting diodes or the like. The guides 36 are positioned opposite the camera 18, and project light lines substantially parallel to the conveyor and in the direction of the camera to provide a high-contrast background for an image captured by the camera. The background formed by the light guides 36 aids in identification of the object position, size and tilt in a captured image.

The image processing apparatus 20 receives images output from the cameras 18 via an input port 38. The apparatus includes a memory 40 and a processor 42, and a monitor, such as a touch-screen display device (not shown) for both receiving input from a user and providing output to the user. To manage the demands of a high-throughput production line, it is important that the memory 40 is large enough to contain at least the captured images and a lookup table 44, and that the processor 42 is capable of managing all tasks required. For example, an image processing apparatus may include 2 GB or more of system memory, and a multi-core processor. Specifically, an example system may contain one or two Intel 3.2 GHz Quad Core Extreme processors, depending on line rate, an Intel Pro/1000 ethernet card, and 4 GB of system memory.

Images received via the input port 38 are stored into the memory 40, and once the images are held in memory, the image processing apparatus 20 relies on the lines projected by the light guides 36 in the background of the captured images to help determine the location, size and tilt of the object in each image. To determine the location, size and tilt of the object in the captured image, the image processing apparatus locates bright to dark transitions in the captured image along the line projected by the light guides. These transitions indicate the position in the image where an edge of the object meets the light guide. Once the edges of the object are located, the relative size of the object in the captured image can be determined and compared to size information stored in the lookup table 44. Additionally, the edges can be used to indicate whether or not the object is tilted, and by what amount. Accordingly, it is important that the light guide appear brighter than the object and/or label, so that the bright to dark transitions can be found.

Once the location, size, and tilt of the object is determined, each object can be "unwrapped," creating a two-dimensional projection of the three-dimensional object and correcting image distortion caused by the curved surface of the object so that the surface of the object appears to have been flattened. Finally, all of the unwrapped images are combined into a single composite image, said to be captured by a "virtual camera" and referred to as a virtual camera image, which shows the photographed object from all sides, similar to a linescan image. Based on the virtual camera image, the image processing apparatus 20 can be used to verify various properties and characteristics of the object can be inspected, including presence and placement of labels, positioning of closures, and the like.

Figure 2:
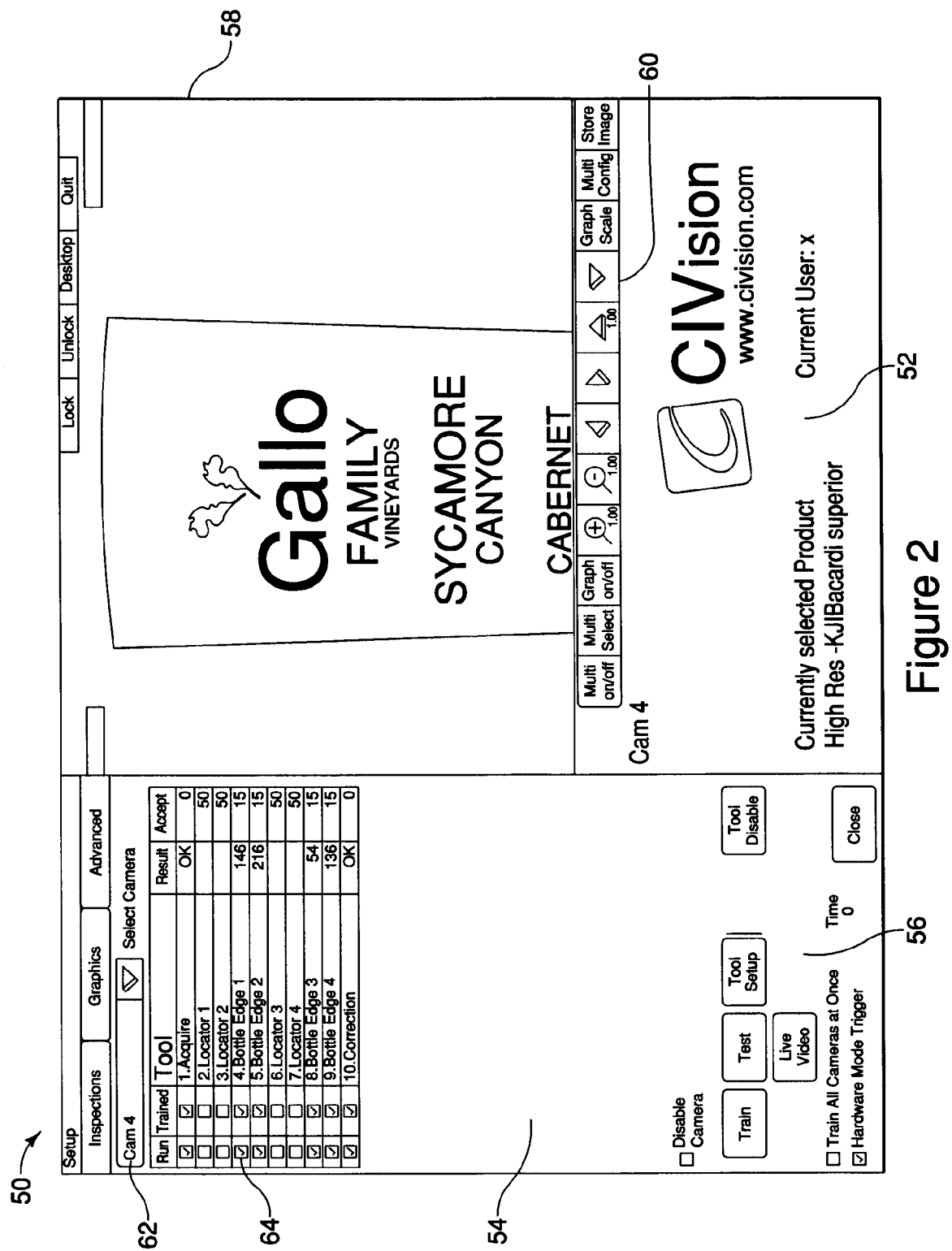
FIG. 2 is a screenshot of a program used to operate the system shown in FIG. 1.

The image processing apparatus 20 further includes operating software 50 for managing the image processing. FIG. 2 is a screenshot of the operating software 50, as displayed by the display device. When running the software 50, the screen is divided into an image display portion 52, a statistical display portion 54, and a control portion 56. The image display portion 52 includes a camera image 58, and image controls 60 allowing a user to zoom in or out on the displayed image 58, pan across the image, both horizontally and vertically, and also to store the displayed image.

Statistical display portion 54 displays information regarding one of the plurality of cameras 18, or the composite image "virtual camera." The user selects a camera from the camera selection control 62, and a table 64 including various inspection tests that may be performed is displayed together with the results of selected tests. Finally, the control portion 56 includes controls allowing the user to perform functions such as display live video for a selected camera, enter a training mode, display camera settings, disable the camera, and the like.

By way of an example, the operation of the system 10 represented in FIG. 1 will be described as used in a winery. That is, the objects being inspected by the system 10 are wine bottles. However, it will be appreciated by those skilled in the art that the system 10 may be used in any number of fields where rapid inspection of product is desired. Additionally, as shown in FIG. 1, four cameras are used to capture images of the wine bottles.

Figure 3:
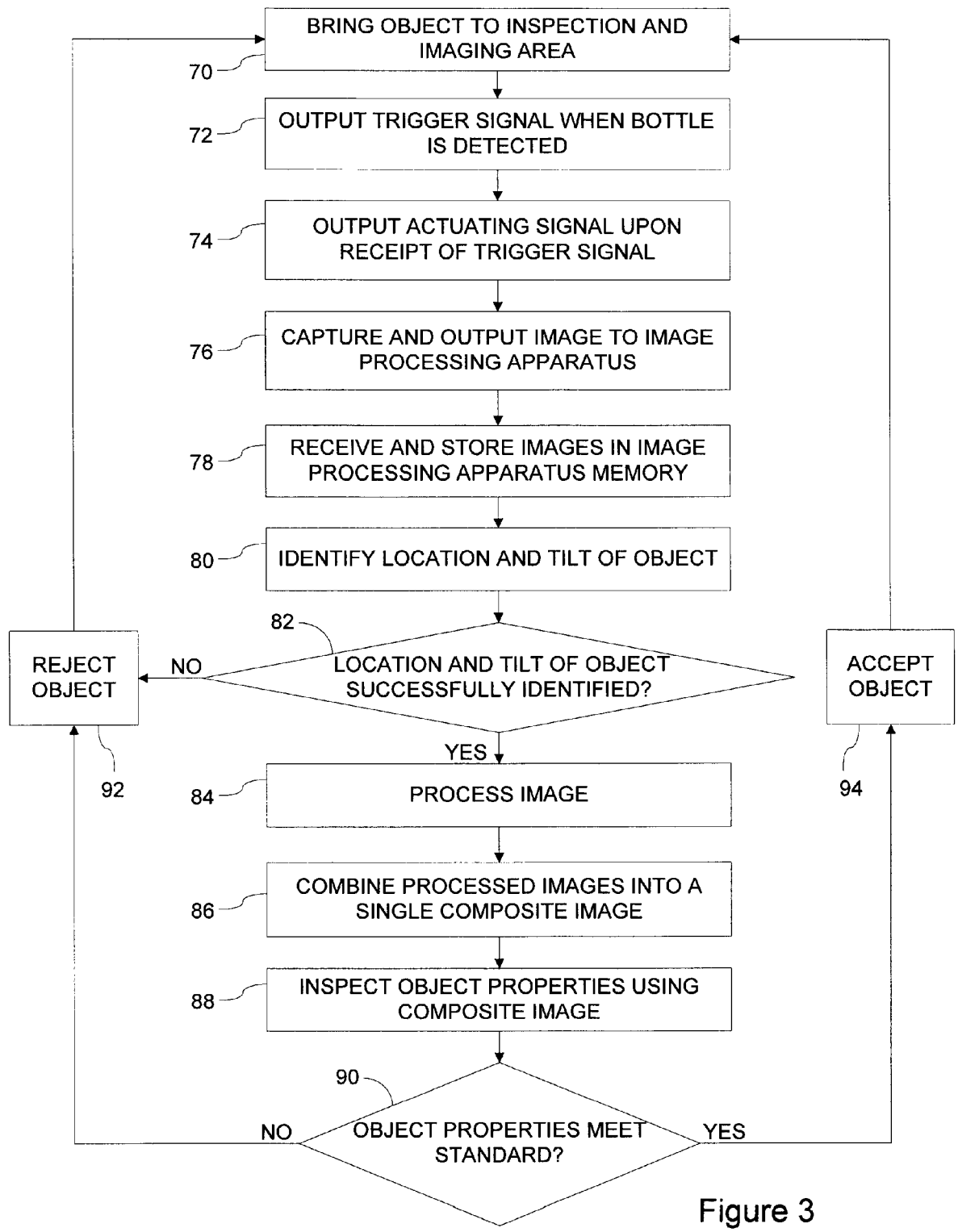
FIG. 3 is a flowchart illustrating a method of imaging an object with a curved surface using the system of FIG. 1.

FIG. 3 is a flowchart showing the method of operation. At the start of the operation, the conveyor 12 transports a bottle to the predetermined inspection area 26 located within the system 10 (Block 70). The sensor 14 senses when the bottle travelling on the conveyor 12 has reached the predetermined inspection area 26. This can be done, for example, by aiming the light beam of a photosensor across the conveyor 12 at the predetermined area 26. Then, when the beam is broken by the wine bottle, the bottle is in position for inspection. At that time, the sensor 14 outputs a high-voltage trigger signal (Block 72).

When the trigger signal is received by the tracking module 16, the module outputs an actuating signal to the input ports 32 of each of the four cameras 18 (Block 74). The actuating signal is preferably relatively high voltage to improve the noise immunity of the system 10.

In response to the received signal, each camera 18 captures an image of the wine bottle. The captured images are then output to the image processing apparatus 20 via camera output ports 34 (Block 76). The cameras 18 are arranged to capture images of the wine bottle from all sides, and are mounted so that the camera position will not shift. Additionally, the arrangement of the cameras provides some overlap in the field of view of each camera to aid in image processing. For example, the four cameras 18 provided in the system 10 are arranged in a ring surrounding the predetermined inspection area 26, at 90 degree intervals. The field of view for each camera 18 is approximately 120 degrees. Thus, the field of view of each camera 18 overlaps with that of the adjacent cameras.

The image processing apparatus 20 receives the captured images and stores them in the system memory 40 (Block 78). The image processing apparatus 20 then determines the location, size and tilt of the bottle in each of the received images (Block 80). This process is performed using a known edge-measurement algorithm, such as the edge-measurement algorithm included in the Matrox Imaging Library. To determine the location, size and tilt of the bottle, the image processing apparatus 20 first locates the light guides 36 in the captured image. The image processing apparatus 20 then follows the light guide horizontally until a bright to dark transition is found. The image processing apparatus 20 uses this transition to determine the position of the bottle edge. Accordingly, it is important that the light guides are brighter than the bottle and the label. Next, the image processing apparatus determines whether or not the edge-finding algorithm successfully identified the location and tilt of the bottle (Block 82). If the edge-finding algorithm is unable to determine the location and tilt of the bottle, the bottle is rejected (Block 92).

After determining the location and tilt of the bottle, each image of the bottle is "unwrapped" (Block 84), creating a 2-dimensional projection of the three-dimensional object and correcting image distortion that occurs because of the curved surface of the bottle so that the surface of the bottle appears to have been flattened. The unwrapping process relies on a known warping algorithm, such as the algorithm provided in the Matrox Imaging Library, used in conjunction with the lookup table 44 maintained in memory 40 that stores information regarding the shape of the bottle. The use of the lookup table 44 helps particularly when correcting for position and/or tilt, and/or size of the bottle.

Figure 4:
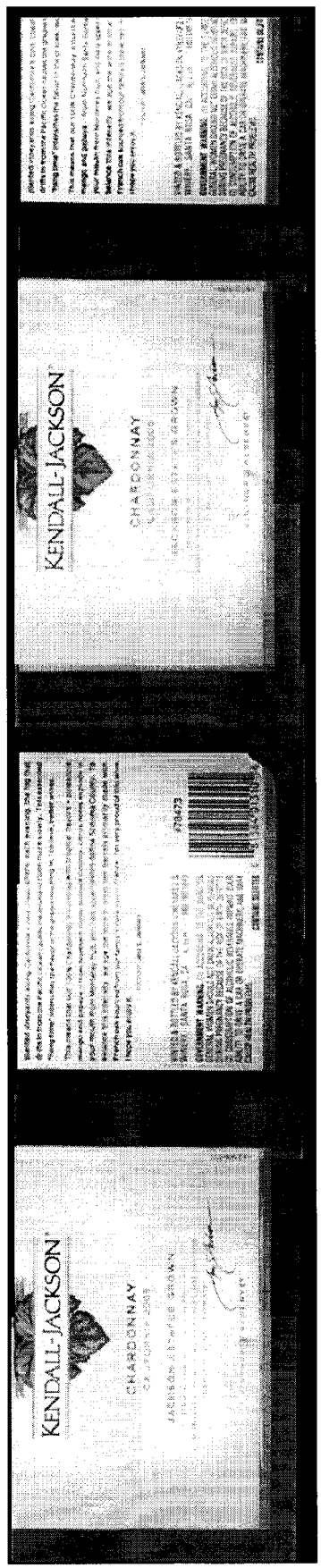
FIG. 4 is a composite image produced by the system of FIG. 1.

Once the bottle has been identified and the images have been unwrapped or flattened, the flattened images are stitched together to form a single composite image that shows the bottle from all sides (Block 86). FIG. 4 shows an example composite image for a wine bottle. Once created, the composite image is preferably displayed on the display device. The display may be used by an operator as an impetus to create new inspection routines, and may also help an operator troubleshoot the system in the event that a persistent problem with, for example, label placement is detected.

The composite image produced by the image processing apparatus 20 is inspected to verify object properties (Block 88). For example, the label position of the wine bottle may be verified. If the label is level, then the y-coordinates of the top edge of the label will be the same across the entire image. Similarly, the edge-to edge distance between two labels can be measured. Finally, various pattern matching algorithms can be used to verify that the label that is applied to the bottle is correct. The measurements are then compared to predetermined standards (Block 90). If the measured properties fail to meet predetermined standards, then the image processing apparatus rejects the bottle (Block 92). The process then returns to Block 70 to be repeated for the next bottle.

Alternatively, if the bottle meets or exceeds the predetermined standards, the bottle is accepted (Block 94). At this point, the entire process returns to Block 70 to be repeated for the next bottle. As noted previously, the system 10 is capable of inspecting in excess of 200 bottles per minute, up to approximately 1200 bottles per minute, depending on bottle size, inspections and available computer technologies.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A system for capturing a composite image of an object with a curved surface while said object is in motion, the system comprising:

a conveyor configured to transport the object to be imaged through a predetermined imaging position;

a sensor configured to produce a signal when the object to be imaged is at said predetermined imaging position;

a plurality of cameras configured to simultaneously photograph the object at said predetermined imaging position from a plurality of different angles;

a tracking module configured to receive said signal from said sensor and output an actuating signal to said plurality of cameras, wherein each camera captures an image when said actuating signal is received; and a processing device that receives a captured image from each of said plurality of cameras, manipulates the received images, and generates a composite 360 degree image of said object based on said manipulated images.

2. The system of claim 1 further comprising one or more light guides corresponding to each of said plurality of cameras, each said light guide positioned directly opposite said corresponding camera.

3. The system of claim 2, comprising four cameras and four pairs of light guides.

4. The system of claim 1, wherein said plurality of cameras are arranged in a ring surrounding said predetermined imaging position.

5. The system of claim 1, wherein said processing device uses an algorithm to correct the received images for distortion caused by the curved surface of the object.

6. The system of claim 5, wherein said processing device judges whether or not one or more labels placed on the object are positioned correctly based on said composite image.

7. The system of claim 6, wherein said image processing device is configured to judge whether or not an object is defective based on a judgment result of said label placement judgment.

8. The system of claim 1, wherein said sensor comprises a light beam that shines across said conveyor to contact a photosensitive material.

9. The system of claim 2, wherein each light guide is adapted to receive light from a light source and to project light lines that are substantially parallel to said conveyor so as to produce a high-contrast background for an image captured by each camera.

10. A method for creating a composite image of an object with a curved surface comprising the steps of:

transporting the object to be imaged on a conveyor through a predetermined position;

sending a signal to a tracking module when a sensor detects that the object to be imaged is at said predetermined position;

outputting an actuating signal from a tracking module to a plurality of cameras upon receipt of said signal from the sensor;

upon receipt of said actuating signal, simultaneously activating each of said plurality of cameras to capture images of the object while the object moves through said predetermined position; and receiving at a processing device said captured images from each of the plurality of cameras, and using said processing device to generate a 360 degree composite image of the object.

11. The method of claim 10, wherein the processing device performs an image manipulation on each of said received images, and said composite image is based on said manipulated images.

12. The method of claim 10, further comprising the step of analyzing said composite image to determine if one or more labels placed on the object are positioned correctly.

13. The method of claim 12, further comprising the step of rejecting said object if one or more of said labels are not positioned correctly.

14. The method of claim 10, further comprising:

providing a light guide corresponding to each of said plurality of cameras, said light guide located substantially directly opposite from a corresponding camera and along a viewing angle thereof, each light guide producing a high-contrast background for an image captured by a corresponding camera by receiving light from a light source and projecting light lines that are substantially parallel to the conveyor.

15. A vision imaging system for capturing a composite image of an object with a curved surface while said object is in motion, comprising:

a conveyor configured to transport the object to be imaged through a predetermined imaging position;

a light source located over said conveyor to illuminate the object;

a sensor configured to produce a signal when the object is located at said predetermined imaging position;

a tracking module configured to receive said signal from said sensor and to output an actuating signal to each of a plurality of cameras provided to capture an image of the object;

a plurality of cameras circumferentially arranged about and aimed at said predetermined imaging position, each camera configured to capture an image of a portion of the curved surface of the object;

a light guide corresponding to each of said plurality of cameras, said light guide located substantially directly opposite from a corresponding camera and along a viewing angle thereof, each light guide adapted to receive light from the light source and to project light lines that are substantially parallel to the conveyor so as to produce a high-contrast background for an image captured by each camera; and an image processing apparatus configured to receive an image from each of said plurality of cameras, to locate edges of the object by detecting bright-to-dark transitions in each image along the line projected by an associated light guide, to perform an image manipulation process on each of said received images, and to generate a composite 360 degree image of the object based on each of said manipulated images.

16. The vision imaging system according to claim 15, wherein said image processing apparatus is further configured to use the located edges of the object to determine the size of the object and to compare the determined size of the object to size information stored in a look-up table.

17. The vision imaging system of claim 15, wherein said image processing apparatus is further configured to use the located edges of the object to determine if the object is tilted and, if so, by what amount.

18. The vision imaging system of claim 17, wherein said image processing device judges whether one or more labels placed on said object are correctly positioned using said generated composite image.

19. The vision imaging system of claim 18, wherein said tracking module is used to track objects that are judged to have incorrectly positioned labels.

20. The method of claim 14, further comprising using said processing device to:
- locate edges of the object by detecting bright-to-dark transitions in each image along the line projected by an associated light guide;
- use the located edges of the object to determine the size of the object and to compare the determined size of the object to size information stored in a look-up table; and
- use the located edges of the object to determine if the object is tilted and, if so, by what amount.

\* \* \* \* \*